June 1, 1965   J. F. SAUT ETAL   3,186,756
CARGO TRANSPORTING VEHICLE CONSTRUCTION
Filed Aug. 18, 1961   10 Sheets-Sheet 1

INVENTORS
JULES F. SAUT
LAYLE B. BARKER
BY
Glenn & Jackson
THEIR ATTORNEYS

June 1, 1965   J. F. SAUT ETAL   3,186,756
CARGO TRANSPORTING VEHICLE CONSTRUCTION
Filed Aug. 18, 1961   10 Sheets-Sheet 2
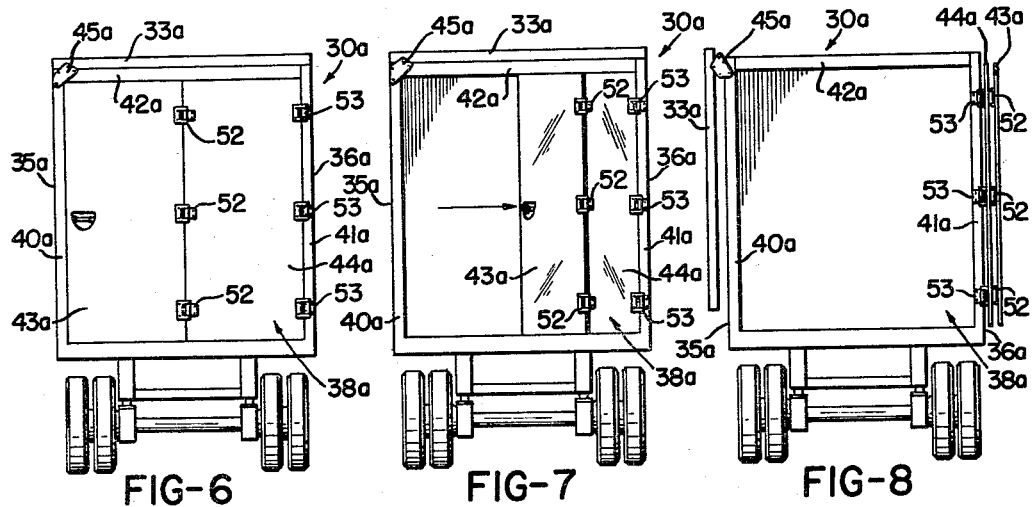
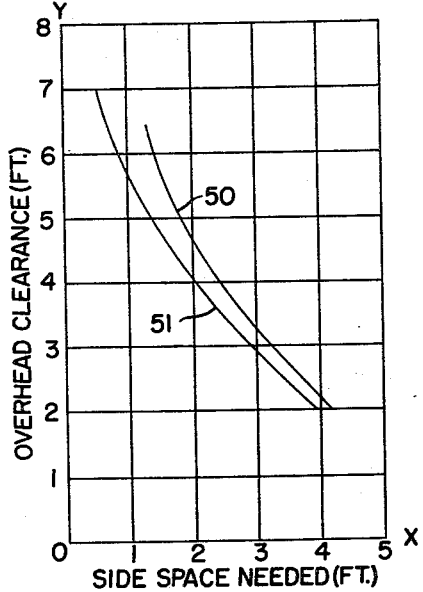
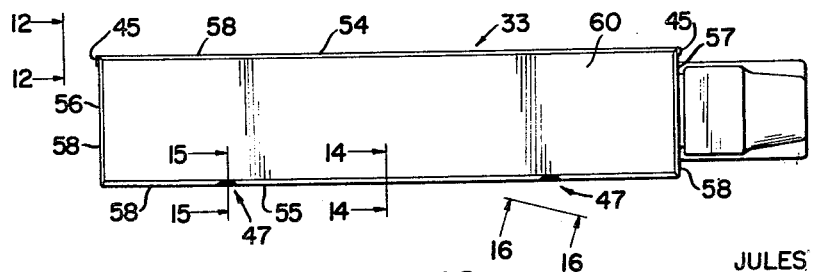
INVENTORS
JULES F. SAUT
LAYLE B. BARKER
BY
THEIR ATTORNEYS

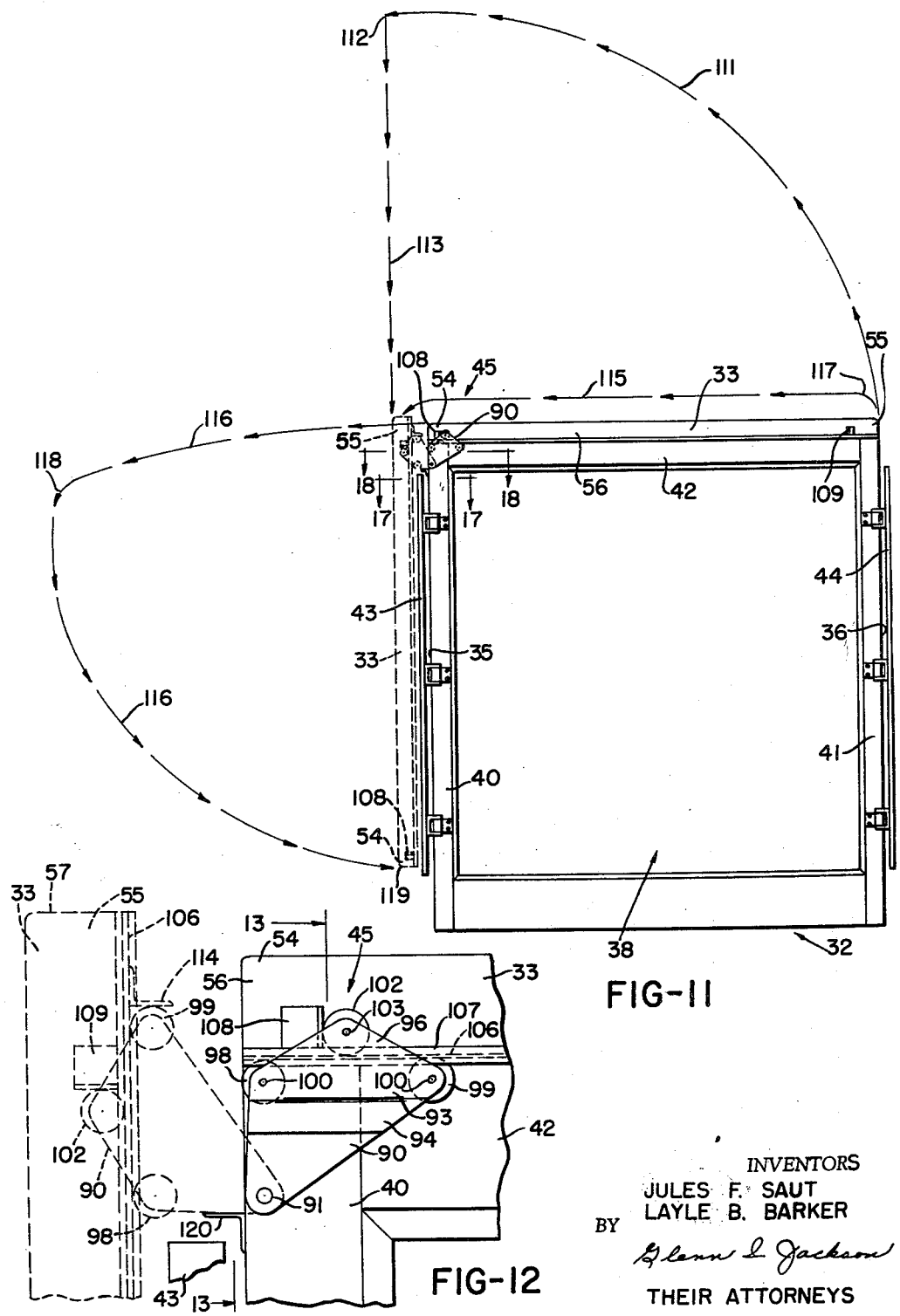

INVENTORS
JULES F. SAUT
BY LAYLE B. BARKER

THEIR ATTORNEYS

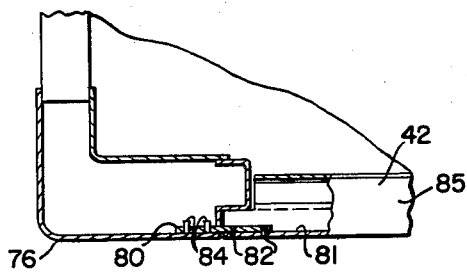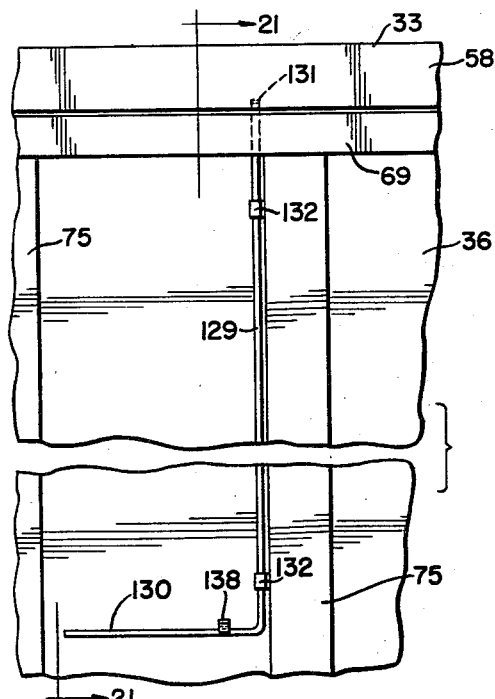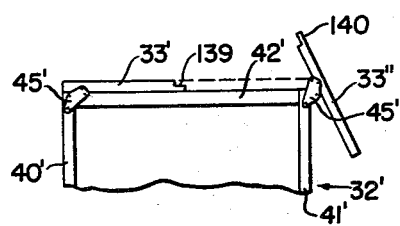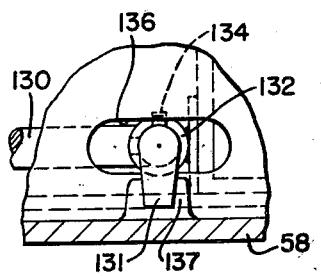

June 1, 1965 J. F. SAUT ETAL 3,186,756
CARGO TRANSPORTING VEHICLE CONSTRUCTION
Filed Aug. 18, 1961 10 Sheets-Sheet 6

INVENTORS
JULES F. SAUT
LAYLE B. BARKER
BY
THEIR ATTORNEYS

INVENTORS
JULES F. SAUT
LAYLE B. BARKER
BY
*Glenn Palmer*
*& Matthews*
THEIR ATTORNEYS

INVENTORS
JULES F. SAUT
LAYLE B. BARKER
BY
THEIR ATTORNEYS

June 1, 1965  J. F. SAUT ETAL  3,186,756
CARGO TRANSPORTING VEHICLE CONSTRUCTION
Filed Aug. 18, 1961  10 Sheets-Sheet 10

INVENTORS
JULES F. SAUT
LAYLE B. BARKER
BY
*Glenn, Palmer*
*& Matthews*
THEIR ATTORNEYS United States Patent Office 3,186,756
Patented June 1, 1965

3,186,756
CARGO TRANSPORTING VEHICLE
CONSTRUCTION
Jules F. Saut, Chesterfield County, and Layle B. Barker,
Henrico County, Va., assignors to Reynolds Metals
Company, Richmond, Va., a corporation of Delaware
Filed Aug. 18, 1961, Ser. No. 133,014
16 Claims. (Cl. 296—100)

This invention relates to an improved cargo-transporting, vehicle construction or the like. More specifically, this invention relates to an improved roof construction for opening and closing the top of a cargo-transporting, vehicle body or the like.

It is well known that a need has existed in the cargo-transporting industry for a cargo-supporting, vehicle body that combines both the desirable feature of an open top vehicle body for easy and rapid overhead loading and unloading thereof and the desirable feature of a closed top vehicle for transporting the cargo from place to place in a weather-proof condition.

For example, in the trucking industry trailer trucks and the like have been provided wherein each cargo-transporting truck body generally comprises a pair of opposed sidewalls and a pair of opposed endwalls extending upwardly from a load-supporting platform, the endwalls and sidewalls defining an open top of the truck body through which cargo and the like can be readily loaded and unloaded. In addition, one of the endwall means normally includes door means whereby the particular endwall means can be selectively opened and closed.

After the cargo has been loaded in such a truck body, the open top thereof is closed by a canvas covering or the like in an attempt to protect the cargo during transportation thereof. However, it has been found that such canvas coverings are not only difficult and time consuming to handle but also the same are readily subject to damage and easily worn out, whereby the damaged or worn out canvas coverings would permit adverse weather to reach the cargo. Thus, these relatively expensive canvas coverings must be frequently replaced.

Therefore, other trailer truck manufacturers and the like have attempted to overcome the disadvantages of the canvas top truck bodies and still combine the dual features of an open top truck body and a closed top truck body in a single unit by providing a movable rigid roof construction, formed of metal or the like, that is adapted to selectively open or close the open top of the truck body.

However, because these rigid roof constructions are relatively large and unwieldy, it was found that the same required too much space to open and close the same in the relatively crowded and confined loading and unloading stations existing today. For example, one type of trailer truck has been produced wherein the rigid roof construction is opened by sliding the roof construction fore or aft of the truck body, whereby the opened truck body requires substantially twice the space required by conventional trucks during the loading and unloading thereof.

Other roof constructions are pivotally mounted to the respective truck bodies and require sufficient space to move the roof constructions through their respective arcs to open and close the truck bodies.

Further, since these prior known rigid roof constructions are relatively large and heavy, it requires auxiliary power means to move the same between their respective opened and closed positions. However, to provide each trailer truck with such auxiliary power means would be too expensive for the intended use thereof. Therefore, it was intended to use the existing power means normally located at the loading and unloading stations, such power means normally comprising overhead hoists and the like. However, these existing power means are generally disposed adjacent the loading platforms and the like, whereby the roof constructions must be moved between their respective opened and closed positions in the relatively small space provided at the stations. Thus, some of these prior known constructions are impracticable for use in conventional loading and unloading stations.

According to the teachings of this invention, however, an improved vehicle construction is provided wherein the open top of the vehicle body is readily and rapidly opened and closed by a rigid roof construction in a minimum of overhead and side space, and, when in the fully opened position, the relatively large roof construction occupies a minimum of space, whereby the vehicle construction of this invention is ideally suited for use in the normally crowded and compact loading and unloading stations existing today. Further, the opening and closing structure of this invention permits the roof construction to be opened and closed in loading and unloading stations and the like where there is sufficient overhead space but a minimum of side space and vice versa. Also, the roof construction can be opened and closed in stations and the like where the overhead and side space respectively vary between the maximum and minimum limits of the vehicle constructions of this invention.

This invention also provides improved grasping means for facilitating the opening and the closing of such roof constructions and the like, as well as improved means for selectively locking such roof constructions or the like in the closed position. Other novel features are also provided which will be hereinafter described.

Therefore, it is an object of this invention to provide an improved cargo-transporting, vehicle construction having one or more of the novel features set forth above or hereinafter shown or described.

Other objects, uses and advantages of this invention are apparent from a reading of this description, which proceeds with reference to the accompanying drawings forming a part thereof and wherein:

FIGURES 6–8 are respectively diagrammatic end views of a trailer truck construction having double doors foldable against one side of the truck body.

FIGURE 9 is a graph illustrating the corresponding overhead and side space requirements for opening and closing two embodiments of the roof construction of this invention.

FIGURE 10 is a top view of one embodiment of the vehicle construction of this invention.

FIGURE 11 is a diagrammatic end view of the vehicle construction illustrated in FIGURE 10 and illustrates some of the different paths through which the roof construction can be moved when opening and closing the vehicle body.

FIGURE 12 is a fragmentary, enlarged view of the hinge construction of this invention and is taken substantially on line 12—12 of FIGURE 10.

FIGURE 18 is a view similar to FIGURE 17 and illustrates the header structure of this invention, the view being taken substantially on line 18—18 of FIGURE 11.

FIGURE 19 is a fragmentary end view of the header structure illustrated in FIGURE 18 and illustrates the method of removing or replacing the header.

FIGURE 20 is a fragmentary, side view of the truck body and illustrates the roof construction locking means.

FIGURE 21 is an enlarged, fragmentary cross-sectional view of the locking means and is taken on line 21—21 of FIGURE 20.

FIGURE 22 is a fragmentary, cross-sectional view taken on line 22—22 of FIGURE 21.

FIGURE 23 is a fragmentary, end view of another embodiment of the vehicle construction of this invention.

Figure 1:
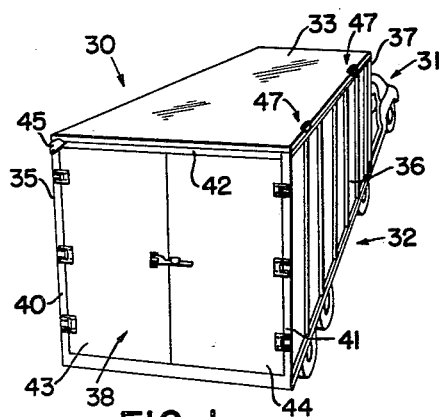
FIGURES 1–3 are respectively diagrammatic, perspective views illustrating the method of opening and closing the roof construction of a cargo-transporting, vehicle construction of this invention.

While the roof construction and other features of this invention are hereinafter described in connection with a trailer truck and the like, it is to be understood that the same are readily applicable to other types of truck constructions and to other types of cargo-transporting vehicles, such as railroad cars and the like. Accordingly, this invention is not limited to only the application thereof illustrated in the drawings, as the same is merely to illustrate one embodiment of this invention.

Figure 2:
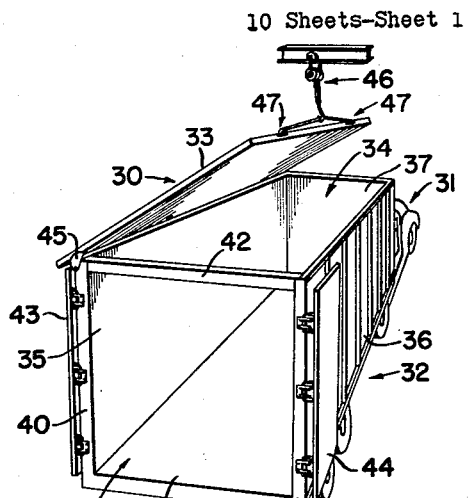
Figure 3:
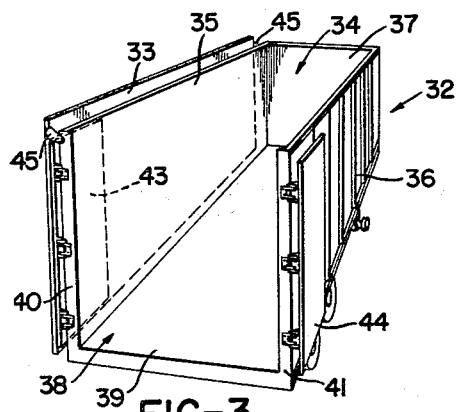

Referring to FIGURES 1–3, a cargo-transporting, vehicle construction of this invention is generally indicated by the reference numeral 30 and comprises a conventional trailer truck cab 31 detachably secured to a cargo-supporting trailer truck body 32.

The truck body 32 is provided with a movable, rigid roof construction 33 that is adapted to selectively open and close the open top 34 of the truck body 32, the open top 34 being defined by the upper edges of a pair of opposed sidewall means 35 and 36 and a pair of opposed end-wall means 37 and 38 respectively extending substantially perpendicular from the bottom or load-supporting surface 39 of the truck body 32.

The aft endwall means 38 of the truck body 32 includes a pair of corner posts 40 and 41 interconnected together at the upper ends thereof by a removable header 42. A pair of doors 43 and 44 are respectively hinged to the corner posts 40 and 41 and are adapted to be moved from the closed position illustrated in FIGURE 1 to the opened and out-of-the-way position illustrated in FIGURE 3 adjacent the respective sidewall means 35 and 36.

The rigid roof construction 33 is interconnected to the truck body 32 by hinge members 45 in a manner hereinafter described, whereby the roof construction 33 is adapted to be both pivotally and slidably movable relative to the truck body 32 between its fully closed position illustrated in FIGURE 1 and its fully opened and out-of-the-way position illustrated in FIGURE 3.

For example, when it is desired to load the truck body 32 with cargo at a suitable loading station, the truck 31 is usually backed into the proper position at the loading station, with the doors 43 and 44 disposed in the opened position illustrated in FIGURE 3, whereby the endwall means 38 can be disposed closely adjacent the conventional raised loading platform of the station. Sometimes the cab 31 is then detached from the parked truck body 32 and is utilized for other purposes while the truck body 32 is being loaded.

Thereafter, the roof construction 33 is opened in any suitable manner, and, in the embodiment illustrated in FIGURE 2, the roof construction 33 is moved from its closed position to its opened position by an overhead hoist 46 which is detachably interconnected to suitable grasping means 47 of the roof construction 33, the grasping means 47 being disposed on the side edge thereof opposite to the hinge members 45. By properly controlling the hoist 46, the roof construction 33 can have the grasping end thereof pivoted to the desired height above the truck body 32. For example, the roof construction 33 may be pivoted to the vertical position A illustrated in dotted lines in FIGURE 4 and thereafter vertically moved to its fully retracted position B adjacent the sidewall means 35 of the truck body 32 by a sliding movement thereof relative to the hinge members 45; or the roof construction 33 can be originally pivoted to the dotted position C illustrated in FIGURE 5, moved to the position D illustrated in full lines in FIGURE 5 by sliding the roof construction 33 relative to the hinge members 45, and, thereafter, pivoted to the fully retracted position E. Of course, the roof construction 33 can be originally pivoted to any desired position between the positions A and C, moved sideways by a sliding movement relative to the hinge members 45 in the same plane that the construction 33 was originally pivoted to until the roof construction 33 is in the desired position, and, thereafter, pivoted to the retracted position B or E, as will be apparent hereinafter.

The header 42 is then removed to provide a fully opened endwall means 38.

When the truck body 32 has been opened in the above manner, the desired cargo can be readily and rapidly loaded therein through the open top 34 and/or the opened endwall means 38 thereof by any suitable apparatus, such as cranes, hoists, fork-lift trucks and the like.

After the truck body 32 has been loaded, the header 42 is replaced and the roof construction 33 is moved back over the open end 34 of the truck body 32 by the hoist 46 to close the same, the roof construction 33 being locked in the closed position in any suitable manner. Thus, when the doors 43 and 44 are closed, the cargo disposed in the truck body is fully protected from the weather, as the rigid roof construction 33 completely closes the top 34 of the truck body 32, whereby the cargo can be transported to the desired location in substantially the same manner as is provided by closed top trailer trucks and the like.

The cargo can then be unloaded from the trailer truck 30 at the desired place by opening the roof construction 33 and endwall means 38 in the above manner.

Therefore, the cargo-transporting, vehicle construction 30 of this invention combines the desirable features of an open top trailer and a closed top trailer in a single unit which is readily suitable for use at existing loading and unload stations, because the movable roof construction thereof can be moved through any desired path during the opening and closing operation thereof with conventional power equipment normally provided at such stations for loading and unloading purposes.

Figure 4:
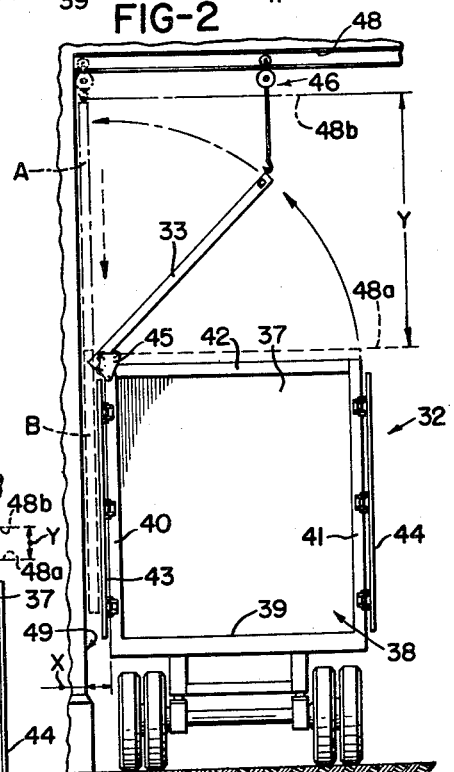
FIGURE 4 is a diagrammatic, elevation view illustrating the method of opening and closing the roof construction in a loading or unloading station having a minimum of side space.
Figure 5:
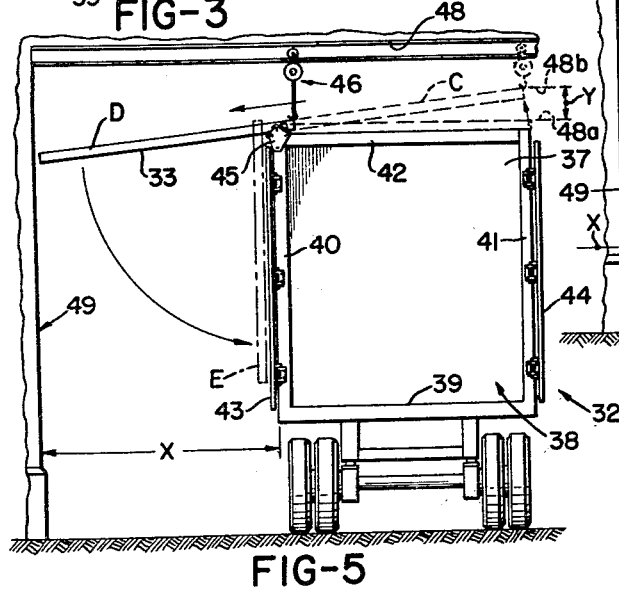
FIGURE 5 is a view similar to FIGURE 4 and illustrates the method of opening and closing the roof construction in a loading or unloading station having a minimum of overhead space or clearance.

For example, as illustrated in FIGURES 4 and 5, typical loading and unloading stations are schematically illustrated and respectively include overhead roof structures 48, such as ceilings, projecting weather coverings, or the like. The reference numerals 49 generally indicate side structures normally disposed adjacent the truck bodies 32 that are to be loaded or unloaded, the structures 49 being sidewalls of the station, adjacent truck bodies or the like.

The loading station illustrated in FIGURE 4 represents a station wherein there is a minimum of side space X between the truck body 32 and the side structure 49, and the loading station illustrated in FIGURE 5 represents a station wherein there is a minimum of overhead space or clearance Y between the top of the truck body 32 in its closed position as represented by the dotted line 48a and the position of the attached hook of the hoist 46 of FIGURE 2 or other lifting means when in its uppermost position during the opening of the roof construction 33 as represented by the dotted line 48b.

Therefore, when the dimensions of the roof construction 33 for a conventional trailer truck are approximately 8 feet by 36 feet by 4 inches thick (the dimension of 4 inches being taken at the peripheral edge of the roof construction 33) it is found that the minimum distance that the side space X in FIGURE 4 can be is approximately 16 inches, and that overhead clearance Y must be at least 6 feet 6 inches to permit the roof construction 33 to be opened and closed in the manner illustrated in FIGURE 4.

Similarly, for a trailer truck 30 having a roof construction 33 of the above dimensions, the minimum overhead clearance Y in FIGURE 5 must be approximately 2 feet, while the side space X must be at least 4 feet 2 inches to permit the roof construction 33 to be opened and closed in the manner illustrated in FIGURE 5.

Accordingly, a trailer truck 30 having a roof construction 33 of the above dimensions can be utilized in loading and unloading stations wherein only 16 inches of side space are provided and the overhead clearance is at least 6 feet 6 inches. Also, the same trailer truck 30 can be utilized in stations wherein the overhead clearance is only 2 feet and the side space is at least 4 feet 2 inches. Of course, the trailer truck 30 can be utilized in stations having side space and overhead clearance dimensions intermediate the minimum and maximum limits illustrated in FIGURES 4 and 5, because as the side space X increases from the minimum illustrated in FIGURE 4 to the maximum illustrated in FIGURE 5, the overhead clearance requirement Y decreases from that illustrated in FIGURE 4 to the minimum illustrated in FIGURE 5.

For example, see the graph illustrated in FIGURE 9, wherein the abscissa X represents the side space needed and the ordinate Y represents the overhead clearance needed. The curve 50 represents the vehicle construction 30 having the above-dimensioned roof construction 33, whereby it can be determined what either the side space X or overhead clearance Y must at least be when either the side space X or overhead clearance Y is a particular dimension.

Thus, should it be found that a particular station has an overhead clearance Y of only 4 feet, then the trailer truck 30 would require at least a side space X of 2½ feet to permit the roof construction 33 thereof to be opened and closed while the truck body is parked beneath the overhead structure 48.

The curve 51 on the graph of FIGURE 9 represents the side space and overhead clearance requirements of the trailer truck 30a illustrated in FIGURES 6–8, wherein the roof construction 33a thereof has the same dimensions as the truck 30. However, since the doors 43a and 44a of the endwall means 38a of the truck 30a are both foldable against the sidewall 36a thereof, the roof construction 33a can be disposed at a closer distance toward the sidewall means 35a than the distance that the roof construction 30 is disposed adjacent the sidewall means 35 when the respective roof constructions 33 and 33a are in their retracted positions.

In particular, the door 43a is hinged to the door 44a by hinges 52 rather than to the corner post 40a and the door 44a is hinged to the corner post 41a by the hinges 53, whereby the door 43a and 44a can be folded with their inside surfaces facing each other in the manner illustrated in FIGURE 7 and then folded against the sidewall means 36a of the truck 30a, as illustrated in FIGURE 8.

Therefore, since there is less space needed between the roof construction 33a and the sidewall means 35a of the truck body 32a when the roof construction 33a is in the retracted position illustrated in FIGURE 8, the hinge members 45a are so designed that when the roof construction 33a has the dimensions of approximately 8 feet by 36 feet by 4 inches thick, the truck 30a can be utilized in the station illustrated in FIGURE 4, wherein the minimum side space X must be approximately 7 inches and the overhead clearance Y must be at least 7 feet. Similarly, when the truck 30a is utilized in the station illustrated in in FIGURE 5, the minimum overhead clearance Y must be approximately 2 feet and the side space X must be at least 3 feet 11 inches. The intermediate side space and overhead clearance requirements for such a truck 30a can be determined by the curve 51 on the graph of FIGURE 9 in the manner previously described.

Therefore, it can be seen that trailer trucks and the like provided with the movable, rigid roof constructions of this invention can be utilized in existing loading and unloading stations because the roof constructons are adapted to be opened and closed under varying conditions of side space and overhead clearance and with conventional power equipment located in such stations. Thus, the cargo-transporting vehicle constructions of this invention combine the desirable features of opened top vehicle bodies and the desirable features of closed top vehicle bodies in such a manner that the resulting constructions are practical for use today without requiring modification of the conventional loading and unloading stations.

While the trailer trucks 30 and 30a are illustrated with the respective roof constructions 33 and 33a being movable to their retracted positions on the driver's side of the vehicles, it is to be understood that the roof constructions 33 and 33a can be modified to be disposed on the other side of the vehicles by merely changing the position of the hinge members 45 and 45a. However, because the driver normally backs the vehicle into the loading and unloading stations, he can best judge the side space on his side of the vehicle to provide sufficient room for moving the respective roof construction to its retracted position.

The specific details of the truck body 32 and roof construction 33 will now be described. However, it is to be understood that truck body 32a and roof construction 33a are formed in the same manner as the truck body 32 and the roof construction 33, except for the doors 43a and 44a as previously described.

Figures 13, 14, 15:
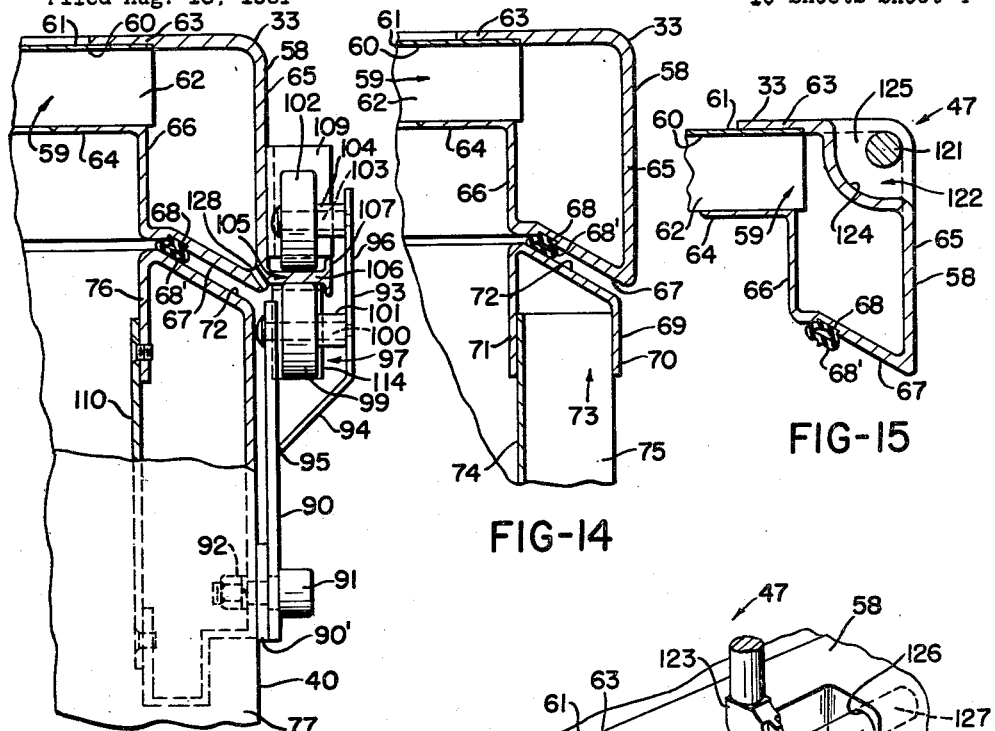
FIGURE 13 is a partial, cross-sectional view of the hinge structure and is taken on line 13—13 of FIGURE 12.
FIGURE 14 is an enlarged, fragmentary, cross-sectional view taken on line 14—14 of FIGURE 10 and illustrates the cooperating edge structure of the roof construction and the vehicle body.
FIGURE 15 is a view similar to FIGURE 14 and is taken on line 15—15 of FIGURE 10, FIGURE 15 illustrating the roof construction grasping means.

As illustrated in FIGURES 10 and 14, the roof construction 33 comprises a substantially rectangular structure having a pair of opposed side edges 54 and 55 and a pair of opposed end edges 56 and 57, the edges 54–57 being defined by a plurality of frame members 58, FIGURE 14, formed in any suitable manner and of any suitable material. For example, the frame members 58 may be formed by extruding metal, such an aluminum containing metal of the like.

Each frame member 58 has an inwardly directed bight portion 59 adapted to telescopically receive the respective edge of the central roof portion 60, which may be formed of metal, such as aluminum containing metal or the like, and have a substantially flat outer skin 61 and a plurality of spaced stiffening portions 62 and projecting inwardly from the skin 61.

The central portion 60 of the roof construction can be formed from a plurality of coplanar sheets 61 suitably secured together at the abutting edges thereof, such as by welding and the like, and the stiffening portions 62 can comprise substantially U-shaped members secured along the seams of the sheets 61 by welding, riveting, or the like. If desired, the stiffening portions 62 can provide the sole securing means between the adjacent sheets 61.

The opposed flanges 63 and 64 of the frame members 58 can be respectively secured to the skin 61 and stiffening portions 62 of the central roof portion 60 by welding, riveting, or the like.

While the roof construction 33 can be formed of any desirable material, it has been found that when the roof construction 33 is formed of aluminum or aluminum alloys, a relatively light-weight, strong, durable structure is provided which can be inexpensively manufactured by simple extrusion and stamping operations, as well as by rapid assembling operations.

Each frame member 58 has a pair of depending flanges 65 and 66 respectively integrally connected at their upper ends to the flanges 63 and 64 and interconnected together at their lower ends by an integral web 67. The web 67 is angularly disposed with respect to the skin 61 and defines a beveled edge 67 for the roof construction 33, the apex of the beveled edge 67 being disposed adjacent the outer surfaces 65 of the frame member 58.

The web 67 of the frame members 58 are each provided with a groove or slot 68 extending throughout the length thereof and having a substantially trapezoidal cross-sectional configuration. A sealing member or gasket 68′, formed of any suitable material, such as neoprene or the like, is received in the respective slot 68 and is retained therein solely by the locking configuration of the slot 68 or by the addition of a suitable adhesive.

The four corners of the roof construction 33 may be formed by properly mitering the abutting frame members 58 at the corners or by providing suitably bent, L-shaped corner frame members 58 (not shown), as desired. In any event, the sealing means 68′ extends around the entire periphery of the roof construction to provide a continuous sealing means for the roof construction.

The frame members 58 define a depending peripheral flange for the roof construction 33 which cooperates with frame members 69, FIGURE 14, extending around the upper edge of the sidewall means 35 and 36 and the endwall means 37.

Each frame member 69 includes a pair of spaced parallel flanges 70 and 71 integrally interconnected together by an angularly disposed web 72, the web 72 defining a beveled edge 72 having the apex thereof disposed closely adjacent to the inside flange 71 and cooperating with the adjacent beveled edge 67 of the frame member 58 when the roof construction is in its closed position.

Each frame member 69 may be formed of any suitable material and in any suitable manner. For example, each frame member 69 may be formed by extruding aluminum containing metal or the like.

The depending flanges 70 and 71 of each frame member define a bight 73 thereof adapted to telescopically receive the upper edges of the respective sidewall means 35 or 36 or endwall means 37 and be secured thereto in any suitable manner.

Each sidewall means 35 and 36 and the endwall means 37 may be formed in any suitable manner, and, in the embodiment illustrated in the drawings, each sidewall means 35 and 36 and the endwall means 37 are formed from a plurality of metal sheets or skin elements 74 secured together in a coplanar relationship by welding or the like. A plurality of vertically extending, external, U-shaped stiffening portions 75 are secured to the skin elements 74 by riveting, welding, and the like. If desired, the stiffening portions 75 may be disposed at the seams of adjacent sheets 74 and provide the sole means for securing the adjacent sheets 74 together.

The remaining endwall means 38, as illustrated in FIGURES 2, 11, 18 and 19, includes a pair of vertically extending corner posts 40 and 41 interconnected together at the upper ends thereof by a removable header 42.

Each corner post 40 and 41 includes a top member 76, FIGURES 13 and 19, secured to the main vertical post section 77. Each top member 76 includes a beveled edge 78 adapted to cooperate with the roof construction 33 and is provided with a slot means 79 adapted to telescopically receive a bracket 80 extending from the respective end of the header 42.

The brackets 80 are respectively secured to the inside surface of the exterior wall 81 of the header 42 by a plurality of bolts 82 and have vertically extending slots 83 adapted to receive horizontally disposed pins 84 carried by the top members 76 when the header is disposed between the corner posts 40 and 41, with the brackets 80 vertically received in the respective slot means 79. Therefore, the header 42 can be removed and replaced in a simple and rapid manner by merely moving the same vertically with respect to the corner posts 40 and 41, the sole attaching means being provided by the brackets 80 and pins 84.

The header 42 is also provided with a beveled upper edge 85 which is disposed in the same plane as the beveled edges 78 of the top members 76 when the header 42 is in its fixed position between the posts 40 and 41.

Thus, when the header 42 is disposed between the corner posts 40 and 41 in the above manner, a continuous beveled edge is provided around the entire periphery of the truck body 32, whereby the continuous beveled edge 67 of the roof construction 33 mates therewith and has the sealing means 68′ compressed therebetween to effectively seal the roof construction in the closed position.

Since the sealing means 68′ is disposed inwardly from the apexes of the beveled edges of the truck body 32, any damage occurring to the beveled edge of the truck body 32, such as by hitting the load thereagainst during loading or unloading operations, is normally borne by the apex of the beveled edge, whereby the sealing area thereof remains undamaged.

While the cooperating beveled edges of the roof construction 33 and truck body 32 define an angularly disposed seam therebetween which extends downwardly from the interior of the truck to the exterior thereof, it is to be understood that beveled edges could be formed in a reverse manner, if desired. However, it is believed that there would be less tendency for inclement weather to enter the interior of the truck body when the beveled edges are formed in the manner illustrated in the drawings.

An inset flange 86 depends from the header 42 and is adapted to cooperate with inset flanges 87 extending inwardly from the corner posts 40 and 41 to provide frame means for the doors 43 and 44 to abut and seal against in a conventional manner when the doors 43 and 44 are disposed in their closed positions to close the endwall means 38.

Figure 17:
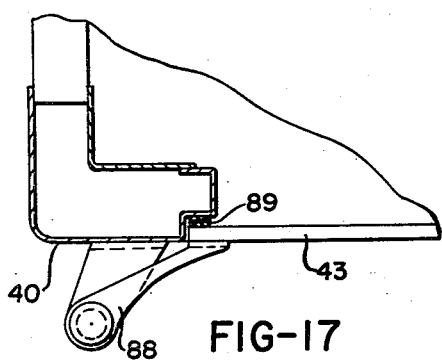
FIGURE 17 is a fragmentary view of the door hinge structure and is taken substantially on line 17—17 of FIGURE 11, except that doors are in the closed positions.

As illustrated in FIGURE 17, each door 43 and 44 is pivotally secured to the respective corner post 40 and 41 by conventional hinges 88 that permit the doors 43 and 44 to be opened against the respective sidewall means 35 and 36 in the manner illustrated in FIGURE 3. If desired, the doors 43 and 44 or the frame flanges 86 and 87 of the header and posts 40 and 41 can carry sealing means 89 to provide an effective seal for the endwall means 38 when the doors 43 and 44 are disposed in the closed position.

In order to interconnect the roof construction 33 to the truck body 32, the hinge members 45 are respectively pivotally secured to the exterior surface of the endwall means 37 and 38 and slidably secured to the roof construction 33.

Since the hinge members 45 are identical, only the hinge member 45 connected to the endwall means 38 is shown in detail and comprises a flat, substantially triangular plate 90, FIGURES 12 and 13, pivotally secured to the corner post 40 of the endwall means 38 by a pivot pin 91, the pivot pin 91 being detachably secured to the corner post 40 by a nut 92 and the plate 90 being spaced from the post 40 by a suitably spacing washer 90'.

A second plate 93 having an angularly bent lower portion 94 is secured to the plate 90 in any suitable manner, such as by welding 95, whereby the upper portion 96 of the plate 93 cooperates with the plate 90 to define a chamber 97 therebetween.

A pair of rollers 98 and 99 are disposed in the chamber 97 and are rotatably carried on pins 100 extending between and secured to plates 90 and 93. Suitable spacers 101 are disposed between the rollers 98 and 99 and the plate 93 to properly position the rollers in the chamber 97.

An upper roller 102 is rotatably carried on a pin 103 carried by and extending inwardly from the upper end 96 of the plate 93, the upper end 96 of the plate 93 and the roller 102 extending beyond the upper end of the plate 90. A suitable spacer 104 properly positions the roller 102 in the same plane with the rollers 98 and 99.

The rollers 98, 99, and 102 of each hinge member 45 may be formed in any suitable manner and of any suitable material. For example, the rollers 98, 99, and 102 may each comprise a conventional metal roller skate wheel or the like, the purpose of the rollers 98, 99, and 102 being to provide anti-friction means between the hinge members 45 and the roof construction 33 to permit relatively easy and effective sliding movement of the roof construction relative to the hinge members 45.

The sets of rollers 98, 99, and 102 of each hinge member 45 respectively define channels 105 therebetween adapted to respectively receive outwardly directed flanges 106 carried by the end edges 56 and 57 of the roof construction 33, whereby the upper rollers 102 are disposed in rolling engagement with the upper surfaces of the flanges 106 and the lower rollers 98 and 99 are disposed in rolling engagement with the lower surfaces of the flanges 106. In this manner, the roof construction 33 is disposed in sliding engagement with the hinge members 45 and is, thus, adapted to be slidably and pivotally movable relative to the truck body 32 by the hinge members 45.

Each flange 106 extends throughout the entire length of the respective end edge 55 or 57 of the roof construction 33 and has an end web 107 for maintaining the respective flange 106 within the channel 105 of the particular set of rollers 98, 99, and 102. The flanges 106 may be formed integrally with the frame members 58 defining the end edges 56 and 57 of the roof construction 33 or may be formed separately and suitably secured thereto.

As illustrated in FIGURE 12, a pair of stop means 108 and 109 may be respectively carried by the opposed ends of the respective end edge 56 or 57 of the roof construction 33 to limit sliding movement of the roof construction 33 relative to the hinge members 45, each stop means 108 and 109 comprising an L-shaped metal member having one of the legs thereof secured to the roof construction 33 in any suitable manner, whereby the other leg thereof is adapted to abut the roller 102 when the roof construction 33 is moved the desired distance in a particular direction.

When initially assembling the roof construction 33, the hinge members 45 are operatively interconnected to the flanges 106 of the roof construction before the stop means 108 and 109 are secured in place. Thereafter, the roof construction 33 is set in place on the open top of the truck body and the hinge members 45 are secured thereto by the respective pivot pins 91. However, it is to be understood that the particular sequence in assembling the roof construction to the truck body 32 may be varied, as desired.

In order to remove the roof construction 33 from the truck body 32, it is merely necessary to detach the pivot pins 91 from the truck body 32, whereby the roof construction can be readily lifted from the truck body 32. For example, suitable access plates 110, FIGURE 13, may be disposed adjacent the pivot pins 91 to permit ready access to the nuts 92 to unfasten the pivot pins 91. Alternatively, the roof construction 33 may be disposed in the position illustrated in dotted lines in FIGURE 11, whereby the stop means 108 can be removed and the roof construction 33 raised upwardly until the flanges 106 have cleared the hinge members 45 to remove the roof construction 33 from the truck body 32.

Therefore, the hinge members 45 not only provide means for readily pivoting and sliding the roof construction 33 between the opened and closed position thereof, but also permit easy and simple assembly and disassembly of the roof construction 33 to and from the truck body 32.

For example, sometimes it may be desirable to utilize the vehicle construction 30 as an open top vehicle, such as when transporting a piece of machinery that extends beyond the open top 34 thereof. Thus, the roof construction 33 can be removed from the truck body 32 in either of the two above described methods and stored in the vertical position in the truck body 32 during such transporting operation. However, it is to be understood that the vehicle construction 30 can also be utilized as an open top vehicle without detaching the roof construction 33, as the roof construction 33 can be disposed in its fully retracted position adjacent the sidewall means 35 during such transporting operation. Further, suitable means can be provided for detachably securing the fully opened roof construction 33 to the sidewall means 35 to prevent swinging thereof relative to the truck body 32 during movement of the vehicle 30 if the weight of the roof construction is not sufficient to prevent such swinging movement.

After the roof construction 33 has been assembled to the truck body 32 by the hinge members 45, the roof construction 33 can be moved between the opened and closed positions in the following manner:

As illustrated by the arrows 111 in FIGURE 11, the side edge 55 of the roof construction 33 is adapted to be moved from its closed position to the point 112 by merely pivoting the roof construction 33 relative to the truck body 32, the hinge members 45 being pivoted about the pivot pins 91 during such movement, and carrying the other side edge 54 of the roof construction 33 to the left a sufficient distance beyond the sidewall means 35 to clear the door 43 folded adjacent the sidewall means 35. Thereafter, the roof construction 33 is moved vertically downward along the path 113 to the position illustrated in dotted lines by a sliding movement of the roof construction 33 relative to the hinge members 45, the rollers 98, 99, and 102 rotating against the flanges 106 during such movement to facilitate the ease of sliding movement of the roof construction 33.

In this manner, the roof construction 33 can be moved between the opened and closed positions with a minimum of side space being utilized.

As illustrated in dotted lines in FIGURE 12, the roof construction 33 is prevented from sliding beyond the fully retracted position illustrated in dotted lines by the stop means 109 engaging against the rollers 102 of the hinge members 45. If desired, a similar stop means 114 may be secured to the underside of the flanges 106 to engage the rollers 99 when the roof construction is in its fully retracted position, the stop means 114 assisting the stop means 109 or being utilized in lieu thereof to limit the sliding movement of the roof construction 33.

The path of the roof construction 33 illustrated by the arrows 111 and 113 represents the path through which the roof construction 33 moves when there is a minimum of side space as illustrated in FIGURE 4.

Similarly, the arrows 115 and 116 illustrate the path through which the roof construction 33 moves when there is a minimum of overhead clearance as illustrated in FIGURE 5. In particular, since there is a depending peripheral flange carried by the roof construction 33, the roof construction must have the side edge 55 thereof initially pivoted to the position 117 in order for the beveled edge 67 of the roof construction 33 at the side edge 55 to clear the beveled edge 72 of the sidewall means 36. Thereafter, the roof construction 33 is moved to the left in a sliding movement relative to the hinge members 45 until the stop means 109 and/or 114 engage the rollers 102 and/or 99, the side edge 54 of the roof construction 33 moving along the path 116 until the same reaches the point 118. Subsequently, the roof construction 33 is then pivoted relative to the truck body 32 by pivoting the hinge members 45 on the pivot pins 91 until the roof construction 33 reaches its fully retracted position illustrated in dotted lines in FIGURE 11, the side edge 54 moving through the arc illustrated by the arrows 119 between the points 118 and 119 during such movement.

When the roof construction 33 is in its fully retracted position adjacent the sidewall means 35 of the truck body 32, as illustrated in dotted lines in FIGURE 12, further pivotal movement of the roof construction 33 in a counterclockwise direction about the pivot pins 91 is prevented by the roof construction 33 abutting the door 43 previously folded adjacent the sidewall means 35. However, if it is desired to prevent engagement of the roof construction 33 against the door 43, stop means 120 may be provided, the stop means 120 each comprising a metal, L-shaped member having one leg thereof secured to the truck body 32 in such a manner that the respective hinge member 45 abuts the other leg thereof when the hinge member 45 has been pivoted to the left the desired degree. Thus, the stop means 120 may be utilized to prevent engagement of the roof construction against the door 43 or against the sidewall means 35a, in the case of the embodiment illustrated in FIGURES 6–8. Such stop means 120 may be carried by the hinge members 45 rather than by the truck body 32 as is apparent.

While it is not illustrated in FIGURE 11, it is to be understood that the hinge means 45 permit any combination of pivotal and sliding movements of the roof construction 33 between those illustrated by the arrows in FIGURE 11, whereby the roof construction can be opened and closed under varying conditions of side space and overhead clearance, as previously described.

When it is desired to close the roof construction 33 from its fully retracted and opened position, the roof construction is moved through any desired path, such as in paths opposite to the direction of the arrows illustrated in FIGURE 11, whereby the beveled edges 67 of the roof construction 33 mate with the beveled edges 72 of sidewall means 35 and 36 and endwall means 37, as well as the beveled edges 78 and 85 of the corner posts 40 and 41 and the header 42 to sealably compress the sealing gasket 68' therebetween to provide a weather-proof closed structure. Further, during such closing operation, the roof construction 33 tends to center itself on the truck body 32, as the beveled edges 67 thereof are telescopically disposed about the beveled edges of the truck body 32.

However, because the sidewall means 35 has the beveled edge 72 mating with the beveled edge 67 of the side edge 54 of the roof construction 33 when the roof construction 33 is being closed, the stop means 108 on the roof construction can be eliminated, if desired, as the mating beveled edges 67 and 72 prevent the roof construction 33 from being moved to the right beyond its closing position, and the hinge members 45 prevent the side edge 54 of the roof construction 33 from being raised above the sidewall means 35 to permit clearance between the mating beveled edges 67 and 72.

In order to pivot and slide the roof construction 33 relative to the truck body 32, to open and close the top 34 of the truck body 32, the roof construction 33 may be provided with any suitable grasping means in any desired location to permit conventional power hoist equipment and the like to be detachably secured to the roof construction 33 to so pivot and slide the same.

Figure 16:
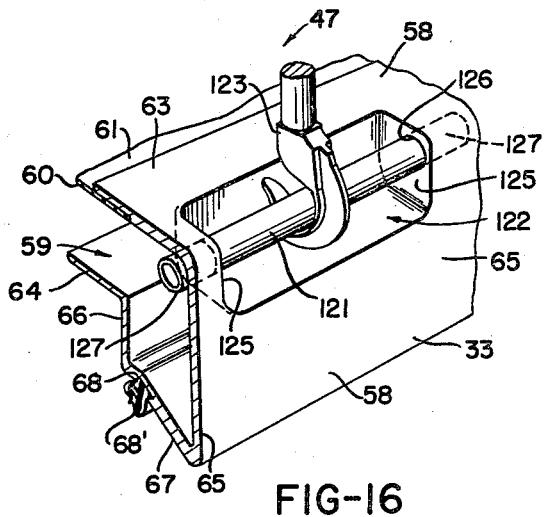
FIGURE 16 is an enlarged, fragmentary, perspective view of the grasping means of this invention and is taken on line 16—16 of FIGURE 10.

For example, the grasping means 47 illustrated in FIGURE 2, each comprises a metal rod or bar 121, FIGURES 15 and 16, extending along a recessed area 122 formed in the frame member 58 of the side edge 55 of the roof construction 33, whereby a hook 123 of the hoist 46 can be readily received around the bar 121 to raise and lower the roof construction 33 relative to the truck body 32.

Each recessed area 122 may be formed by stamping the frame member 58, whereby a concave wall 124 is provided inwardly of the natural contour of the frame member 58, the concave wall 124 being integrally interconnected to the exterior surface of the frame member 58 by side webs 125. Each side web 125 is suitably bored at 126 to permit the rod 121 to be passed therethrough, so that the projecting ends 127 of the rod 121 are disposed in abutting relation with the under surface of the outer skin section 63, 65 of the frame member 58. In this manner the outer skin section 63, 65 of the frame member 58 bears the load of the roof construction 33 when the hoist or other power means is raising or lowering the same. The ends 127 of the rods 121 may be secured to the frame member 58 by welding or the like.

While only two such grasping means 47 are illustrated, it is to be understood that one or more may be utilized as desired. Further, the recessed areas 122 may be formed by cutting an opening in the frame members 58 and, thereafter, securing a cup-shaped member on the inside thereof to close the recess area 122 to prevent rain and the like from entering the interior of the roof construction 33.

However, should any moisture and the like enter the interior of the roof construction 33, suitable weep or drain passages may be provided therein to permit the moisture to drain from the roof construction 33. For example, a plurality of angularly disposed passages 128, FIGURE 13, may be provided in the exterior skin portion of the frame members 58 adjacent the apexes of the beveled surfaces 67 thereof to readily expel such moisture.

While any suitable means may be provided to selectively lock the roof construction 33 in the closed position, one such means is illustrated in FIGURES 20–22 and comprises an elongated rod 129 slidably and rotatably secured to one of the stiffening portions 75 of the sidewall means 36 and having a handle 130 at one end thereof and a latching member 131 at the other end thereof.

The rod 129 is slidably and rotatably secured to the truck body 32 by brackets 132 encompassing the rod 129 and being secured to a side of a stiffening portion 75, the brackets 132 having guiding slots 133 therein receiving guiding pins 134 projecting from the rod 129.

The upper end of the rod 129 is adapted to pass through an opening 135 formed in the beveled flange 72 of the frame member 69 and an aligned, elongated opening 136 formed in the beveled flange 67 of the frame member 58 of the roof construction 33 when the roof construction 33 is in the closed position.

The latching member 131 is adapted to lock against an abutment 137 carried by the frame member 58 when the locking rod 129 is disposed in the locked position.

In order to unlock the roof construction 33 from its closed position, the handle 130 is rotated to the right from the position illustrated in FIGURES 20-22, whereby the latching end 131 of the rod 129 is rotated to the right out of engagement with the abutment 137 and into alignment with the openings 136 and 135. Thereafter, the rod 129 is moved vertically downwardly by sliding the same relative to the brackets 132, whereby the latching end 131 of the rod 129 is lowered out of the way into the frame member 69, the downward movement of the rod 129 being controlled by the length of the slots 133 in the brackets 132. Thus, the roof construction 33 is unlocked from its closed position and may be opened when desired in the above manner.

When it is desired to lock the roof construction 33 in its closed position, the rod 129 is raised vertically upwardly by sliding the same relative to the brackets 132 until the pins 134 reach the end of the slots 133, the end 131 of the rod 129 being moved vertically upwardly through the aligned openings 135 and 136 during such movement.

Thereafter, the rod 129 is rotated to the left to permit the end 131 thereof to lock against the abutment 137. As the rod 129 is rotated to the left to lock the end 131 against the abutment 137, the handle 130 is received under a spring clip 138 which holds the rod in the locked position under normal conditions. Thus, the roof construction 33 is locked in its closed position by the rod 129 as the pins 134 prevent sliding movement of the rod 129 relative to the brackets 132 when the rod 129 is in the rotational position illustrated in the drawings. If desired, the abutment 137 can be a cam surface, whereby the rod 129 causes the roof construction 33 to be pulled downwardly as the rod 129 is being rotated to the left to assure a tight seal between the frame members 58 and 69.

While only one such looking rod 29 is illustrated, it is to be understood that one or more locking rods 129 may be utilized along the sidewall means 36, as desired.

Therefore, it can be seen that there has been provided an improved vehicle construction having a rigid roof construction that can selectively open and close the top of the cargo-transporting body to provide the desirable features of both a closed vehicle body and an open vehicle body in a single unit, the roof construction being adapted to be opened and closed in the normally crowded loading and unloading stations existing today.

While the various embodiments of this invention have been described in connection with a single roof construction for the cargo-transporting body, it is to be understood that the roof construction can comprise a plurality of individually movable sections. One such embodiment is illustrated in FIGURE 23, wherein a pair of roof sections 33' and 33" are respectively pivotally and slidably mounted to the truck body 32' by hinge members 45', whereby each roof section 33' or 33" can be opened and closed, as desired, in the above manner. The mating edges of the roof sections 33' and 33" may be so constructed and arranged that the same have overlapping portions 139 and 140 to provide mating sealing surfaces when the same are disposed in the closed positions thereof. Similarly, each half section 33' and 33" may be divided into a plurality of individually movable sections, each being pivotally and slidably mounted to the truck body 32' by hinge members 45'.

Further, while the various embodiments of this invention heretofore described each has the hinge means for the roof construction thereof externally mounted relative to the respective truck body, it is to be understood that the hinge means may be internally mounted, if desired.

Figure 24:
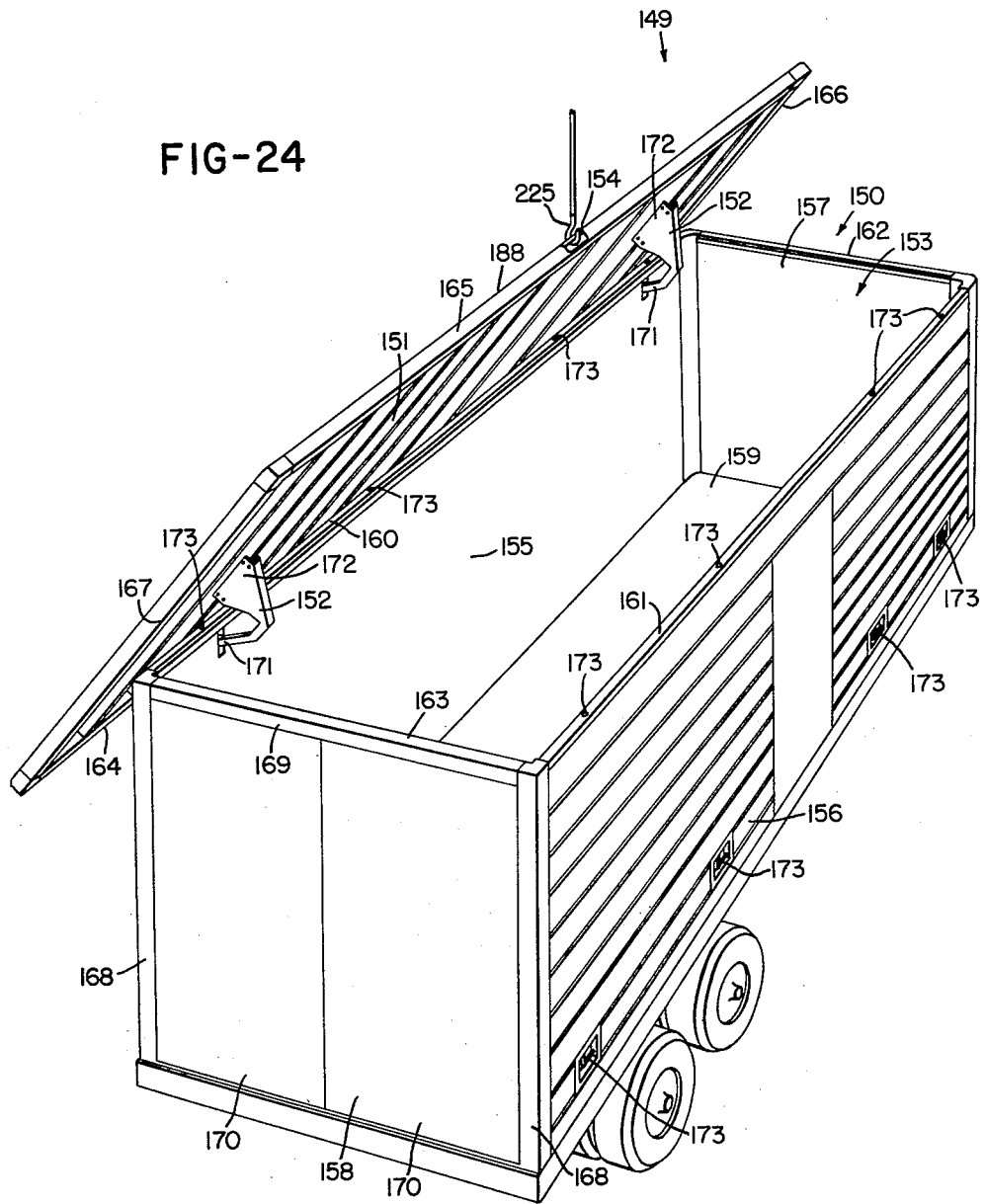
FIGURE 24 is an enlarged, perspective view illustrating another cargo-transporting, vehicle construction of this invention.

For example, another vehicle construction 149 of this invention is illustrated in FIGURE 24 and comprises a trailer truck body 150 having a rigid roof construction 151 pivotally and slidably mounted thereto by internally disposed hinge members 152 whereby the roof construction 151 is adapted to selectively open and close the open top 153 of the truck body 150 by moving through the various arcs previously described, the roof construction 151 being moved between the opened and closed positions thereof by a suitable hoist or the like interconnected to the grasping means 154 thereof.

The truck body 150 comprises a pair of opposed sidewall means 155 and 156 and a pair of opposed endwall means 157 and 158 respectively secured to a load supporting bottom 159 of the truck body 150 and extending vertically upwardly therefrom. The sidewall means 155 and 156 of the truck body 150 have upper edges 160 and 161 cooperating with upper edges 162 and 163 of the endwall means 157 and 158 to define a peripheral flange surrounding the open top 153 of the truck body 150.

The roof construction 151 has a pair of opposed side edges 164 and 165 cooperating with a pair of opposed end edges 166 and 167 thereof to define a peripheral flange of the roof construction 151 that cooperates with the upper peripheral flange of the trailer truck body 150 in a manner hereinafter described to fully close the open end 153 of the truck body 150 so that adverse weather and the like cannot reach the interior of the truck body 150 when the roof construction 151 is in its closed position.

The endwall means 158 of the truck body 150 comprises a pair of corner posts 168 interconnected together at the upper ends thereof by a removable header 169 and respectively carrying a pair of doors 170 whereby the endwall means 158 can be completely opened by opening the doors 170 and removing the header 169 in substantially the same manner previously described for the other trailer truck bodies of this invention.

The hinge members 152 respectively have one of the ends 171 thereof pivotally secured to the sidewall means 155 of the truck body 150 and the other ends 172 thereof slidably interconnected to the roof construction 151 whereby the roof construction 151 is slidably and pivotally mounted to the truck body 150.

A plurality of locking means or members 173 are respectively carried by the sidewall means 155 and 156 of the truck body 150 to selectively lock the roof construction 151 in its closed position in a manner hereinafter described whereby the roof construction 151 can be maintained in its closed position until it is desired to open the same.

Therefore, it can be seen that the vehicle construction 149 illustrated in FIGURE 24 operates in substantially the same manner as the other vehicle constructions of this invention, except the hinge means 152 thereof are mounted internally of the truck body 150.

The specific details of the hinge members 152 and other novel features of the vehicle construction illustrated in FIGURE 24 will now be described.

Figure 25:
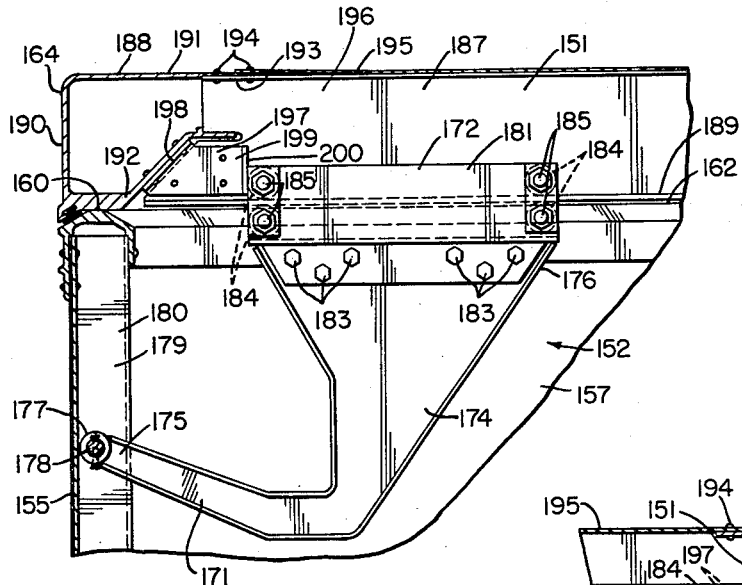
FIGURE 25 is a fragmentary, enlarged, cross-sectional view of the vehicle construction of FIGURE 24 and illustrates the hinge structure thereof.
Figure 26:
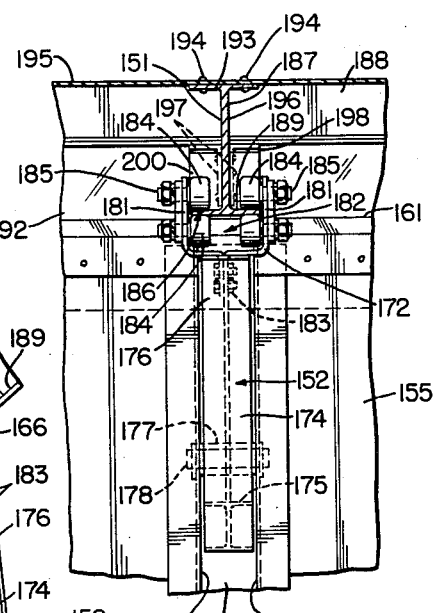
FIGURE 26 is an end view of the hinge structure illustrated in FIGURE 25.
Figure 27:
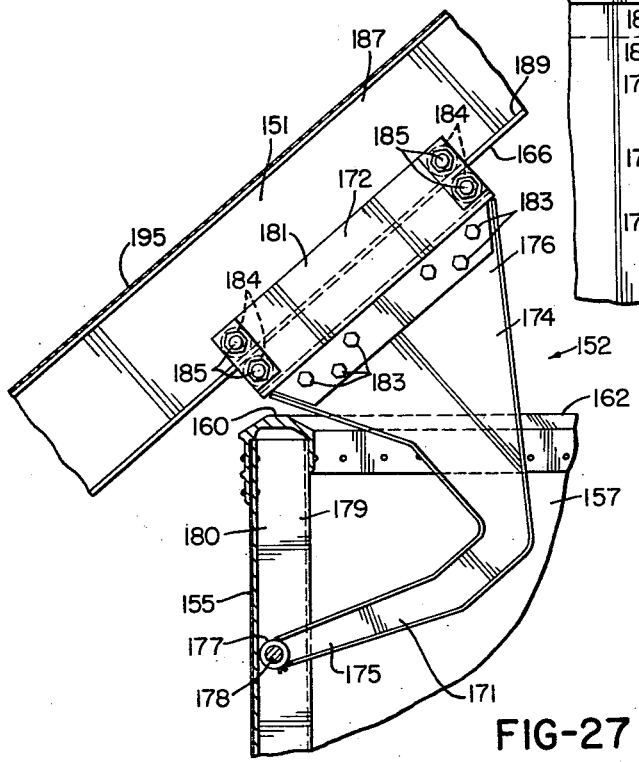
FIGURE 27 is a view similar to FIGURE 25 and illustrates the hinge structure in one of its operating positions.

Reference is now made to FIGURES 25-27 respectively illustrating one of the hinge members 152 of the vehicle construction 149 of FIGURE 24, the hinge members 152 being substantially identical and, therefore, only one such hinge member 152 is illustrated in FIGURES 25-27.

Each hinge member 152 comprises a substantially C-shaped structural member having a pair of opposed ends 175 and 176, the end 175 of the member 174 carrying a transversely disposed sleeve or bushing 177 that receives a shaft 178 extending between the opposed sidewalls 179 of a channel-defining member or side post 180 forming part of the sidewall means 155 of the truck body 150.

In this manner, each hinge member 152 is pivotally mounted by the pins 178 to the sidewall means 155 of the truck body 150 so that the end 172 thereof is adapted to be moved from a closed position on one side of the sidewall means 155 to an opened position on the other side of the sidewall means 155 for the purpose previously described.

The other end 176 of the structural member 174 of each hinge member 152 carries a pair of plates 181 which cooperate together to define a channel 182 therebetween whereby the end 172 of each hinge member 152 is substantially U-shaped, the plates 181 being secured to opposite sides of the structural member 174 by a plurality of bolts 183 or the like.

Each plate 181 carries two pairs of opposed rollers 184 at the opposed ends thereof, the rollers 184 being mounted in cantilevered fashion in the channel 182 by a plurality of shafts 185 passing through the plates 181. Each pair of opposed rollers 184 defines a channel means 186 therebetween aligned with the channel means 186 of the other pairs of opposed rollers 184 for a purpose hereinafter described.

Each hinge member 152 is adapted to be slidably connected to the roof construction 151 by the roller means 184 in the manner illustrated in FIGURES 25–27.

In particular, the roof construction 151 carries a plurality of T-shaped flange members or roof bows 187 secured to the opposed peripheral frame members or side rails 188 of the roof construction 151 in a manner hereinafter described, each flange member 187 having the cross element 189 thereof received in the channel 182 of a respective hinge member 152 and disposed in the channel means 186 defined by the rollers 184.

In this manner, the roof construction 151 is slidably mounted to the ends 172 of the hinge members 152 because the cross elements 189 of the flange members 187 can roll on the rollers 184 in substantially the same manner previously described.

The peripheral frame members 188 of the roof construction 151 can be formed in any suitable manner and of any suitable material, and, in the embodiment illustrated in the drawings, each frame member 188 is formed by extruding metallic material, such as aluminum-containing metallic material or the like, in a conventional extruding apparatus in a manner well known in the art. Each frame member 188 has a side section 190 provided with a pair of inwardly directed top and bottom flanges 191 and 192.

The top flange 191 of each frame member 188 is interconnected to another cross element 193 of the flange members 187 by rivets 194 or the like.

Similarly, the exterior skin elements 195 of the roof construction 151 are riveted to the top flange means 191 of the frame members 188, as well as to the cross elements 193 of the longitudinally disposed flange members or roof bows 187 in the manner illustrated in FIGURE 25.

The lower flange means 192 of the side frame members 188 are interconnected to the legs 196 of the flange members 187 by plates 197, each plate 197 having a flange 198 riveted to the flange means 192 of the frame member 188 and the central body portion 199 thereof riveted to a leg 196 of a respective frame member 187.

Thus, each flange member or roof bow 187 has the leg 196 thereof secured to the flange means 192 of the frame 188 by a pair of plates 197 disposed on opposite sides of the leg 196 thereof.

Each plate 197 has an end flange 200 adapted to provide stop means for limiting movement of the roof construction 151 relative to the hinge members 152 in a particular direction thereof. Thus, sliding movement of the roof construction 151 relative to the hinge members 152 is limited by the stop means 200 carried at the opposed side edges 164 and 165 of the room construction 151.

Therefore, it can be seen that the roof construction 151 is pivotally and slidably mounted to the trailer truck body 150 by the hinge members 152 whereby the roof construction 151 can be moved through any desired path to fully open or fully close the open top 153 of the truck body 150 in substantially the same manner as previously described except that the hinge members 152 are completely hidden from view when the roof construction 151 is in its closed position.

The locking members 173 of the truck body 150 are each identical to and operate in the same manner as the other locking members 173. Therefore, only the details and operation of one such locking member 173 is illustrated in FIGURES 28–30, and it is to be understood that the other locking members 173 are formed and operate in a like manner.

Figure 28:
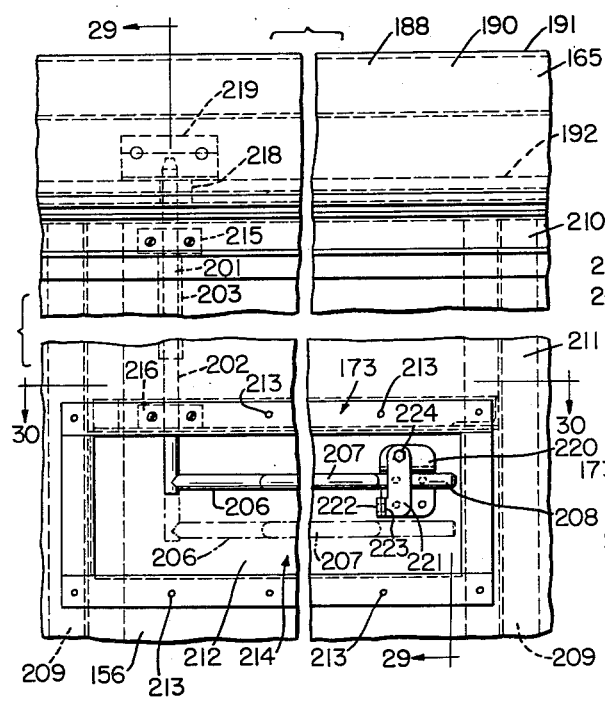
FIGURE 28 is an enlarged, fragmentary, side view of one of the sidewall means of the vehicle construction of FIGURE 24 and illustrates the locking means thereof.
Figure 29:
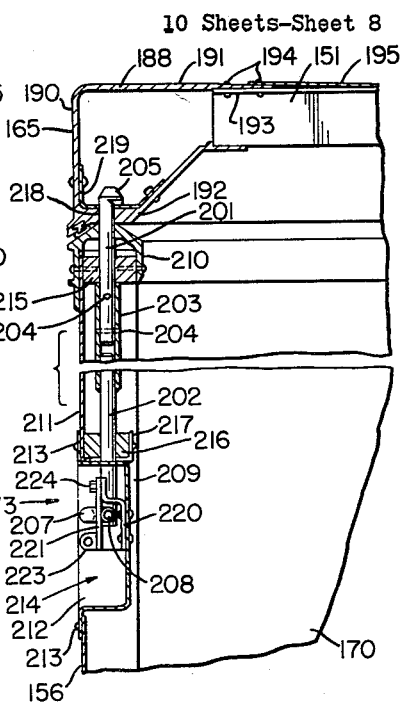
FIGURE 29 is a cross-sectional view taken on line 29—29 of FIGURE 28.
Figure 30:
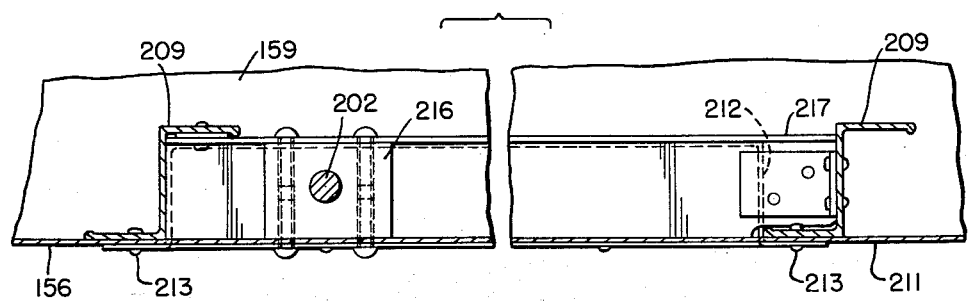
FIGURE 30 is an enlarged cross-sectional view taken on line 30—30 of FIGURE 28.

As illustrated in FIGURES 28–30, each locking member 173 comprises a pair of rods 201 and 202 respectively interconnected together in aligned relation by a sleeve 203, the sleeve 203 telescopically receiving the adjacent ends of the rods 201 and 202 and being interconnected thereto in any suitable manner, such as by pins 204 or the like.

The rod 201 has a hooked-shaped end 205 adapted to perform a locking operation in a manner hereinafter described.

The other rod 202 has a handle portion 206 extending from the free end thereof and provided with a U-shaped portion 207 to provide a handle or grasping means intermediate the rod 202 and the end 208 of the rod 206.

Each locking member 173 is adapted to be carried by one of the sidewall means 155 and 156 of the truck body 150 and extend longitudinally through the respective sidewall means 155 or 156.

In particular, each sidewall means 155 or 156 is formed from a plurality of spaced vertically aligned side posts 209 interconnected together at their upper ends by a side lintel or frame member 210, the frame members 210 also serving to interconnect the skin or surface elements 211 to the side posts 209.

A plurality of cup-shaped members 212 are respectively disposed in openings formed along the lower portions of the sidewall means 155 and 156 and are secured to the skin elements 211 thereof by rivets 213 or the like, the cup-shaped elements 212 providing cavities 214 interrupting the exterior surface of the sidewall means 155 and 156 to respectively receive the handle portions 206 of the locking members 173 in the manner illustrated in FIGURES 24, 28, 29 and 30.

Each locking member 173 is disposed in a longitudinal passageway formed through the respective sidewall means 155 or 156 and interconnecting the cavity 214 thereof with the exterior surface of top lintel 210 thereof whereby the locking member 173 can be disposed in such passageway with the rod 201 projecting above the top lintel 210 and the rod 202 projecting into the cavity 214 of the respective cup-shaped member 212.

The rod 201 passes through a suitable bearing 215 carried by the top lintel 210 and the rod 202 passes through a suitable bearing 216 carried by an angle member 217 disposed on the top of a respective cup-shaped member 212.

In this manner, the sleeve 203 of a respective locking member 173 is movable between the bearings 215 and 216 whereby the sleeve 203 limits axial movement of the respective locking member 173 in an upward and downward direction for a purpose hereinafter described.

The side frame members 188 of the roof construction 151 are provided with a plurality of elongated slots 218 passing through the lower flanges 192 thereof in the manner illustrated in FIGURES 28 and 29, the slots 218 being respectively aligned with the locking members 173 to receive the hooked-shaped ends 205 thereof when the locking members 173 have been rotated to the proper position and moved axially upwardly. Thereafter, the locking members 173 are rotated to the position illustrated in FIGURES 28 and 29 whereby the hooked-shaped ends 205 of the locking members 173 cam over bearing plates 219 secured to the upper surfaces of the flanges 192 of the side frame members 188 to lock the roof construction 151 in the closed position. When the locking members 173 are disposed in the position illustrated in FIGURES 28 and 29, the sleeves 203 thereof are abutting the top bearings 215 whereby the sleeves 203 cooperate with the hooked-shaped ends 205 to lock the roof construction 151 in its closed position.

The locking members 173 are adapted to be locked in the locking positions thereof by having the ends 208 of the handle portions 206 received between keeper base plates 220 secured to the cup-shaped members 212 and keeper arms 221 pivotally secured to the keeper base plates 220. The keeper base plates 220 and keeper arms 221 respectively have cooperating lugs 222 and 223 which mate with each other in the manner illustrated in FIGURES 28 and 29 so that a suitable padlock or the like can pass through aligned apertures in the lugs 222 and 223 to lock the keeper arms 221 in the position illustrated whereby the ends 208 of the locking members 173 will be retained in the locking position.

When it is desired to unlock the roof construction 151 from its closed position, each keeper arm 221 of each locking member 173 is moved from the position illustrated in FIGURE 28 about the pivot point 224 to uncover the end 208 of the grasping rod 206 of the respective locking member 173. With the keeper arm 221 in this pivoted position, the handle portion 207 of the rod 206 is grasped to rotate the rods 201 and 202 in a clockwise direction whereby the hooked-shaped end 205 thereof aligns itself with the slot 218 in the side frame member 188 of the roof construction 151. With the locking member 173 rotated in this new position, the locking member 173 is pulled axially downwardly to the position illustrated in dotted lines of FIGURE 28 whereby the sleeve 203 abuts the bearing 216 to limit further downward axial movement of the rods 201 and 202, the hooked-shaped end 205 clearing the side frame member 188 of the roof construction 151 and being received in the top lintel 210 of the respective sidewall means 155 or 156. Thereafter, the lowered locking member 173 can be rotated back to its original position whereby the handle portion 206 thereof will be fully received in the cavity 214 of the respective cup-shaped member 212 and thereby be disposed in an out-of-the way position.

Therefore, it can be seen that each of the locking members 173 can be unlocked from the roof construction 151 in the above manner whereby the roof construction 151 can be subsequently moved to an open position in any of the manners previously described.

When it is desired to move a locking member 173 from its unlocked position to the locking position thereof, the rods 202 and 203 are rotated from the position illustrated in dotted lines in FIGURE 28 in a clockwise direction approximately 90° whereby the hooked-shaped end 205 of the locking member 173 is aligned with the elongated slot 218 in the side frame member 188 of the roof construction 151. Thereafter, the rods 201 and 202 are raised vertically upwardly while in this new rotational position thereof by merely raising the handle portion 206 vertically upwardly whereby the hooked-shaped end 205 of the locking member 173 is raised above the bottom flange 192 of the side member 188 of the roof construction 151 when the sleeve 203 abuts against the bearing 215 to prevent further upward movement of the rods 201 and 202. Subsequently, the handle portion 206 of the raised locking member 173 is rotated back to the position illustrated in full lines in FIGURES 28 and 29 to cause the hooked-shaped end 205 to cam over the bearing plate 219 of the side frame member 188 hold the roof construction 151 in a closed position.

In this manner, it can be seen that the locking members 173 are adapted to selectively lock the roof construction 151 in its closed position.

Figure 31:
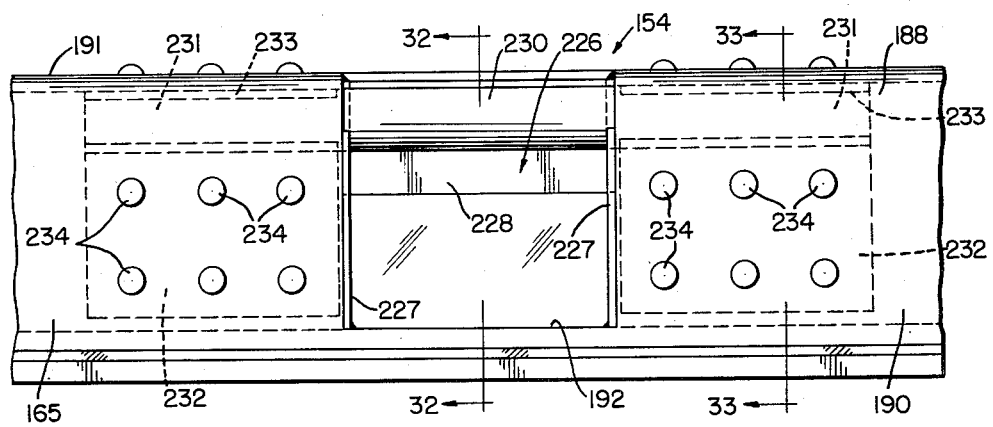
FIGURE 31 is an enlarged, fragmentary, side view of one of the grasping means of the vehicle construction of FIGURE 24.
Figure 32:
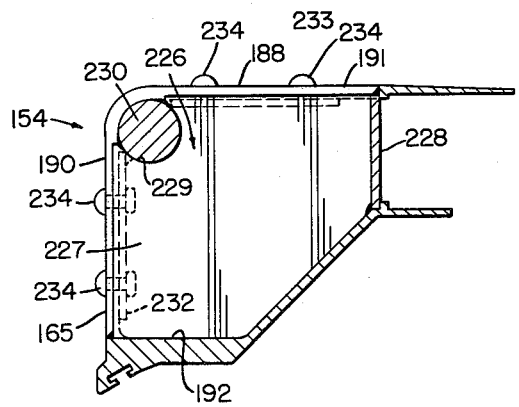
FIGURE 32 is a cross-sectional view of FIGURE 31 and is taken on line 32—32 thereof.
Figure 33:
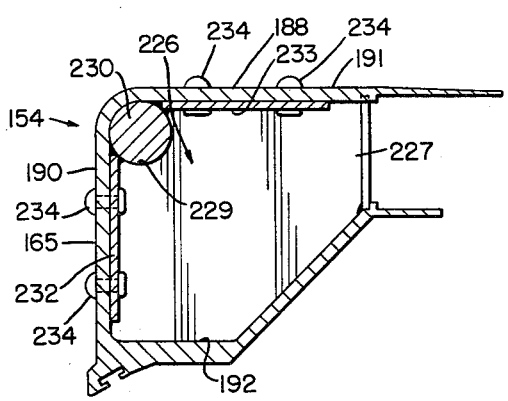
FIGURE 33 is another cross-sectional view of FIGURE 31 and is taken on line 33—33 thereof.

While the roof construction 151 can be provided with any suitable grasping means along the side edge 165 thereof to be detachably secured to a hook 225 of a suitable hoisting apparatus or the like in order to raise and lower the roof construction 151 between its open and closed position, one embodiment of the grasping means 154 is illustrated in FIGURES 31–33.

In particular, the side frame member 188 defining the side edge 165 of the roof construction 151 has the side portion 190 and upper flange 191 thereof cut away for a short distance centrally of the ends thereof to define a cavity 226, the cavity 226 being lined with suitable side plates 227 and an end plate 228 to prevent moisture and the like from entering the interior of the side frame member 188.

The side plates 227 are cut away at 229 adjacent the juncture of the side portions 190 of the side frame members 188 and the top flange 191 thereof in the manner illustrated in FIGURES 32 and 33 whereby a rod 230 or the like is adapted to pass through the cut-away portions 229 have the ends 231 disposed beyond the cavity 226 and respectively abutting the inside surface of the side frame member 188.

A plurality of plates 232 and 233 are respectively disposed against the side portion 190 and top flange 191 of the side frame member 188 adjacent the cavity 226 thereof to reinforce the side frame member 188 at the ends 231 of the lifting bar 230, the plates 232 and 233 being secured to the side frame member 188 by a plurality of rivets 234 or the like.

The lifting bar 230 has its ends 231 welded to the side frame member 188 as well as to the plates 232 and 233 in the manner illustrated in FIGURE 33 whereby the lifting rod 230 is permanently secured to the side frame member 188 and is disposed at the forward end of the cavity 226. In this manner the hook 225 of the hoisting apparatus or the like can be readily received in the cavity 226 and disposed around the lifting bar 230 to pivot and slide the roof construction 151 between its opened and closed positions.

While only one grasping means 154 is illustrated for the roof construction 151, it is to be understood that one or more grasping means 154 may be provided as desired.

Figure 34:
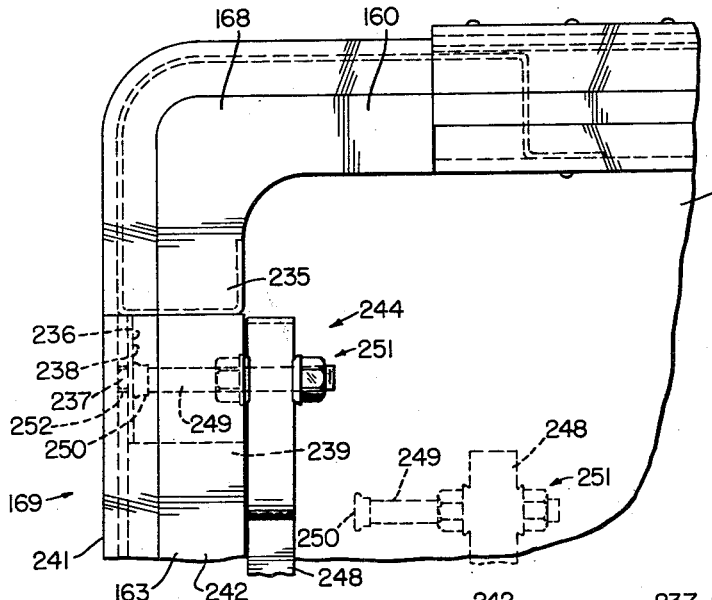
FIGURE 34 is an enlarged, fragmentary top view of the opened vehicle construction of FIGURE 24 and illustrates a corner post and header thereof.
Figure 35:
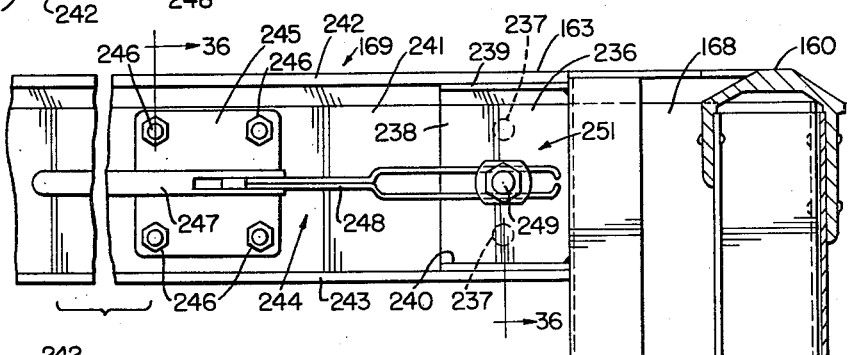
FIGURE 35 is an end view of the structure illustrated in FIGURE 34.
Figure 36:
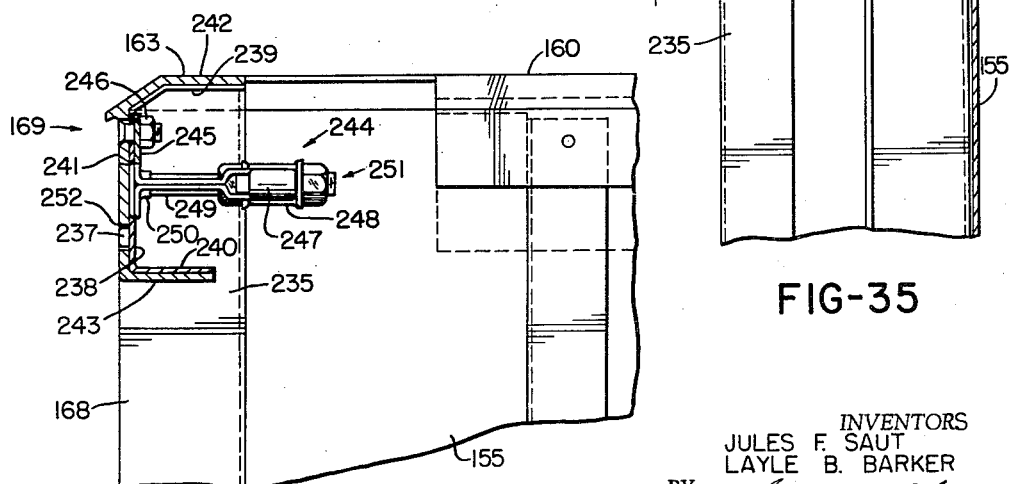
FIGURE 36 is a cross-sectional view of the structure illustrated in FIGURE 35 is taken on line 36—36 thereof.

While the corner posts 168 and removable header 169 of the truck body 150 can be constructed in any desired manner, one embodiment thereof is illustrated in FIGURES 34–36 wherein each corner post 168 is substantially L-shaped in cross section and has an end 235 extending toward the end 235 of the other corner post 168.

A plate 236 projects outwardly from each end 235 of each corner post 168 and extends toward the plate 236 of the other corner post 168, the plates 236 being welded or otherwise secured to the corner posts 168 and having a plurality of locating pins 237 projecting outwardly from one side thereof for a purpose hereinafter described.

Each plate 236 comprises a side member 238 having a top flange 239 extending inwardly therefrom and a bottom flange 240 extending inwardly therefrom, the plates 236 respectively having a configuration adapted to be telescoped into the removable header 169 in the manner illustrated in FIGURES 34–36.

The header 169 has a side portion 241 provided with an inwardly directed top flange 242 and an inwardly directed bottom flange 243 adapted to be disposed around the flanges 239 and 240 of the plates 236, as illustrated.

A clamping means 244 is carried at each end of the header 169 and is adapted to cooperate with an adjacent plate 236 to hold the header 169 in a fixed position relative to the corner post 168.

While any suitable clamping means can be utilized to detachably interconnect the header 169 to the plates 236, one type of clamping means is illustrated in the drawings and comprises model No. 235–U manufactured by the Detroit Stamping Company, Detroit, Michigan.

Each clamping member 244 comprises a base plate 245 secured to the side portion 241 of the header 169 by a plurality of bolts 246. The base plate 245 carries a toggle arrangement wherein a handle 247 is interconnected to a toggle arm 248 carrying a rod 249 having a resilient or cushioned tip 250, the toggle arm 248 being adjustably secured to the rod 249 at 251 in a manner well known in the art.

When the handle 247 is disposed in the position illustrated in the drawings, the toggle arm 248 is disposed in aligned relation therewith whereby the rod 249 has the end 250 thereof compressed against the side portion 238 of the adjacent plate 236 to hold the header 169 in a fixed position relative to the plates 236.

When the arm 247 is pivoted relative to the plate 245, the toggle arm 248 is pivoted relative to the plate 245 and moves the rod 249 away from the plate 236 to the position illustrated in dotted lines in FIGURE 34 so that the header 169 can be pulled outwardly in a horizontal direction relative to the corner post 168 to be removed from the truck body 150.

The side portion 241 of the header 169 is provided with a plurality of openings 252 adapted to respectively receive the locating pins 237 of the plates 236 when the header 169 is replaced in the position illustrated in FIGURES 34–36. Thus, the locating pins 237 and apertures 252 provide proper locating means for the header 169 when the same is being replaced. After the header 169 has been replaced over the plates 236, the handles 247 of the clamping members 244 are moved to the position illustrated in the drawings whereby the toggle arms 248 are moved into aligned relation therewith and compacts the resilient ends 250 of the rods 249 against the body portions 238 of the plates 236 to hold the header 169 in a fixed position relative to the corner post 168.

Therefore, it can be seen that a novel arrangement has been provided whereby the header 169 can be detachably secured to the corner post 168 so that the header 169 can be removed when desired and can be subsequently locked in place when desired.

Thus, it can be seen that the trailer-truck body 150 and roof construction 151 provide another embodiment of this invention having features not present in the other embodiments of this invention.

This aplication is a continuation-in-part of the co-pending patent application, Serial Number 56,503, filed September 16, 1960, and entitled "Cargo Transporting Vehicle Construction," now abandoned.

Accordingly, this invention provides cargo-transporting, vehicle constructions wherein the rigid roof constructions thereof can be readily moved between the opened and closed positions thereof to selectively provide opened top units for facilitating rapid loading and unloading thereof and closed top units for transporting the cargo in a safe weather-proof condition.

While the form of the invention now preferred has been disclosed as required by the statutes, other forms may be used, all coming within the scope of the claims which follow.

What is claimed is:

1. In combination, a vehicle body having a pair of opposed sidewall means and having a pair of opposed endwall means, said sidewall means and said endwall means respectively having top edge means defining an open top of said body, a hinge member having a pair of opposed ends, one of said ends of said hinge member being pivotally secured to one side surface of one of said wall means of said body below said top edge means to cause the other end thereof to be movable through an arc between positions on opposite sides of one of said sidewall means, and a roof construction for selectively opening and closing at least a part of said open top of said body, said roof construction being slidably interconnected to the other end of said hinge member to be slidably and pivotally movable relative to said body to open and close at least a part of said open top thereof.

2. A combination as set forth in claim 1, wherein said roof construction carries stop means to limit sliding movement of said roof construction in a particular direction relative to said hinge member.

3. A combination as set forth in claim 1, wherein said body carries stop means to limit pivotal movement of said hinge member in a particular direction relative to said body.

4. A combination as set forth in claim 1, wherein a plurality of rollers are carried by the other end of said hinge member, and said roof construction has means slidably received between said rollers to slidably interconnect said roof construction to said hinge member.

5. In combination, a vehicle body having a pair of opposed sidewall means and having a pair of opposed endwall means, said sidewall means and said endwall means defining an open top of said body, one of said endwall means including door means movable from a closed position to an open position adjacent the outside surface of one of said sidewall means to open said one endwall means, and a movable roof construction interconnected to said body to selectively open and close said open top thereof, said roof construction being movable to a position adjacent said outside surface of said one sidewall means with said door means interposed therebetween to open said top of said body and said one endwall means thereof.

6. In combination, a vehicle body having a pair of opposed sidewall means and having a pair of opposed endwall means, said sidewall means and said endwall means respectively having top edge means defining an open top of said body, a hinge member having a pair of opposed ends, one of said ends of said hinge member being pivotally secured to one side surface of one of said sidewall means below said top edge means thereof to cause the other end thereof to be movable through an arc between positions on opposite sides of said one sidewall means, and a roof construction for selectively opening and closing at least a part of said open top of said body, said roof construction being slidably interconnected to the other end of said hinge member to be slidably and pivotally movable relative to said body to open and close at least part of said open top thereof.

7. A combination as set forth in claim 6 wherein another hinge member has one end thereof pivotally secured to said one sidewall means and the other end thereof slidably interconnected to said roof construction.

8. In combination, a vehicle body having a pair of opposed sidewall means and having a pair of opposed endwall means, said sidewall means and said endwall means respectively having top edge means defining an open top of said body, a hinge member having a pair of opposed ends, one of said ends of said hinge member being pivotally secured to the inside surface of one of said sidewall means below said top edge means thereof to cause the other end thereof to be movable through an arc between positions on opposite sides of said one sidewall means, and a roof construction for selectively opening and closing at least a part of said open top of said body, said roof construction being slidably interconnected to the other end of said hinge member to be slidably and pivotally movable relative to said body to open and close at least part of said open top thereof.

9. A combination as set forth in claim 8 wherein another hinge member has one end thereof pivotally secured to said one sidewall means and the other end thereof slidably interconnected to said roof construction.

10. In combination, a vehicle body having a pair of opposed sidewall means and having a pair of opposed endwall means, said sidewall means and said endwall means respectively having top edge means defining an open top of said body, a hinge member having a pair of opposed ends, one of said ends of said hinge member being pivotally secured to one side surface of one of said sidewall means below said top edge means thereof to cause the other end thereof to be movable through an arc between positions on opposite sides of said one sidewall means, and a roof construction for selectively opening and closing at least a part of said open top of said body, said roof construction having the inside surface means thereof slidably interconnected to the other end of said hinge member to be slidably and pivotally movable relative to said body to open and close at least part of said open top thereof.

11. A combination as set forth in claim 10 wherein another hinge member has one end thereof pivotally secured to said one sidewall means and the other end thereof slidably interconnected to said roof construction.

12. In combination, a vehicle body having a pair of opposed sidewall means and having a pair of opposed endwall means, said sidewall means and said endwall means defining an open top of said body, a hinge member having a pair of opposed ends, one of said ends of said hinge member being pivotally secured to one of said sidewall means to cause the other end thereof to be movable through an arc between positions on opposite sides of said one sidewall means, the other end of said hinge member having roller means defining channel means therebetween, and a roof construction for selectively opening and closing at least a part of said open top of said body, said roof construction having flange means projecting therefrom and received in said channel means of said hinge member whereby said roof construction is slidably and pivotally movable relative to said body to open and close at least part of said open top thereof.

13. A combination as set forth in claim 12 wherein another hinge member has one end thereof pivotally secured to said one sidewall means and the other end thereof slidably interconnected to said roof construction.

14. A combination as set forth in claim 12 wherein said hinge member is substantially C-shaped.

15. A combination as set forth in claim 12 wherein said flange means of said roof construction is substantially T-shaped with the cross element thereof disposed in said channel means.

16. A combination as set forth in claim 12 wherein said other end of said hinge member is substantially U-shaped and said roller means are rotatably mounted to the legs of said U-shaped end.

References Cited by the Examiner
UNITED STATES PATENTS

| | | | |
|---|---|---|---|
| 388,409 | 8/88 | Grace | 16—179 |
| 516,400 | 3/94 | Nalton | 296—40 |
| 1,322,310 | 11/19 | Kring | 296—137 |
| 1,343,291 | 6/20 | Test | 296—137 |
| 1,720,280 | 7/29 | Kirchner | 16—179 |
| 2,022,718 | 12/35 | Heins | 296—137 X |
| 2,067,798 | 1/37 | Songer | 16—179 X |
| 2,070,586 | 2/37 | Fitch | 296—137 |
| 2,167,489 | 7/39 | Renga | 16—179 |
| 2,371,497 | 3/45 | Black | 296—137 |
| 2,525,309 | 10/50 | Norberg | 16—137 X |
| 2,656,216 | 10/53 | Bobroff | 296—137 |
| 2,725,099 | 11/55 | Frie et al. | 296—49 |
| 2,969,284 | 1/61 | Ambli | 296—100 |
| 2,971,797 | 2/61 | Walters | 296—40 |
| 2,985,118 | 5/61 | Mahariek | 296—100 X |
| 3,012,814 | 12/61 | Penner | 296—100 |
| 3,069,199 | 12/62 | Reardon et al. | 296—100 |

FOREIGN PATENTS

| | | |
|---|---|---|
| 6,553 | 1914 | Great Britain. |
| 680,405 | 10/52 | Great Britain. |

A. HARRY LEVY, *Primary Examiner.*

GEORGE HYMAN, Jr., PHILIP ARNOLD, *Examiners.*